Aug. 22, 1944.   M. SMOLENSKY   2,356,360
VALVE CONSTRUCTION
Filed Feb. 6, 1942

Michael Smolensky,
INVENTOR.

BY Saywell & Wesseler,
ATTORNEYS.

Patented Aug. 22, 1944

2,356,360

UNITED STATES PATENT OFFICE 2,356,360

VALVE CONSTRUCTION

Michael Smolensky, Cleveland, Ohio

Application February 6, 1942, Serial No. 429,707

3 Claims. (Cl. 251—144)

This invention, as indicated, relates to a valve construction. More particularly it comprises a check valve constructed so as to operate with high efficiency and to have a long period of service life without attention.

The principal object of the present invention is to provide a valve construction permitting free flow at high capacity through the passageways for the fluid to be controlled by such valve, and having a valve plug and valve seats adapted to form a perfect seal when the valve is closed and having full freedom of action under the influence of the fluid within the passageways under all ranges of service conditions.

Another object of the invention is to provide a valve construction having a body portion easy to construct and with large internal area for free flow of fluids therein and having the valve seats and guide sleeves formed of metal, preferably of a hard non-oxidizing character whereby a perfect seal is maintained and freedom of action of the plug provided for.

Another object of the invention is to provide a valve casing or body formed as a casting with cylindrical passageways for the through bolts, such passageways being offset from the outer wall structure of the valve body to provide free passage of fluid outwardly thereof.

Another object of the invention is to provide marginal liners combined with valve seats formed of stainless steel, or similar metal, having hardness and non-oxidizing characteristics whereby satisfactory sealing of the valve passageway may take place at all times.

Another object of the invention is to provide spiders and guide sleeves of stainless steel, or similar metal, to insure a free sliding action of the valve plug under all conditions of heavy duty service.

Another object of the invention is to provide a valve plug having free sliding action and having a housing for a spring adapted to center the spring and prevent an accumulation of foreign matter within the spring chamber.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but several of various forms in which the principle of the invention may be used.

Figure 1:
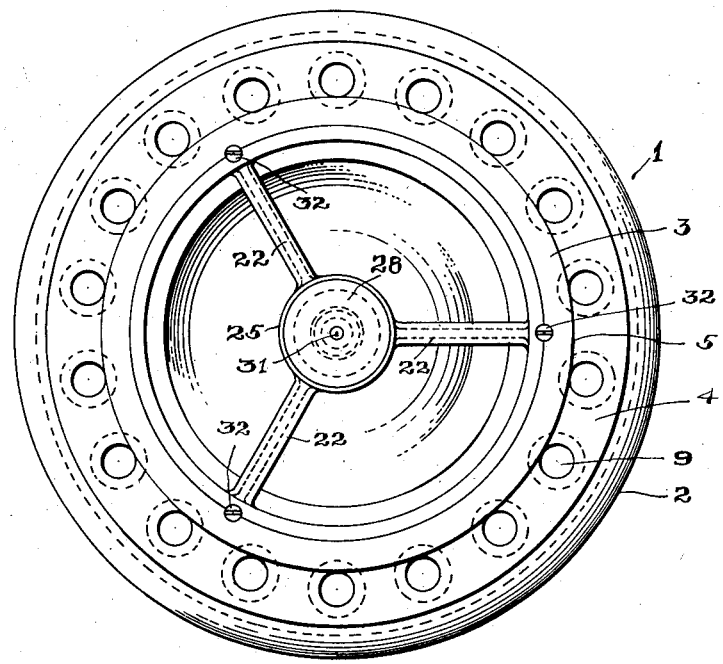
Figure 2:
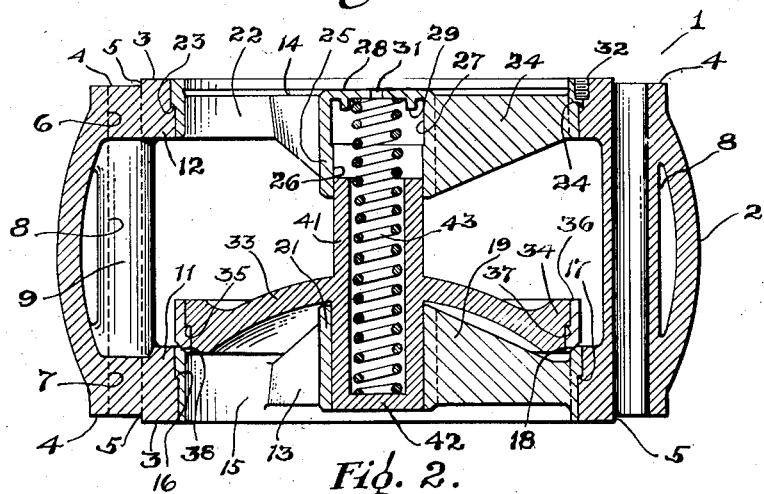

In said annexed drawing:

Fig. 1 is a top plan view of a valve construction embodying the principles of the invention; and Fig. 2 is a central vertical sectional view of the structure shown in Figure 1.

The valve construction, as shown in the drawing, comprises a casing or body member 1, preferably formed of cast metal, and preferably having outwardly bowed, or globular outer walls 2, over the greater portion of the lateral extent of such body member. In order to secure the body member to the flanges of conduits or the like, the end faces are formed with upstanding central areas 3 and cutaway marginal portions 4, providing annular shoulders 5. Outwardly of the shoulders 5 a series of aligned openings 6, 7, are provided in the respective end faces, and tubular members 8, preferably cast integrally with the casing, provide through passageways 9 for the assembly bolts of the valve unit. These tubular passageways, it will be noted, are spaced from the side walls of the casing over the greater portion of their extent and permit free fluid circulation around the same. The casting of the casing is facilitated by the construction inasmuch as simple dowel pins free of axial positioning in the molds form the passageways in exactly the positions required.

The annular end members 11 and 12 of the casing are each arranged to receive spiders 13, 14, having a reduced number or radial arms shown as three in number and supporting cylindrical hub and guide members for the valve plug centrally, and having peripheral liner members for the openings through the end wall of the casing. Each of the spiders is preferably formed of stainless steel, or some other suitable non-oxidizing metal or alloy of sufficient strength.

The opening through the end wall 11 is of smaller diameter than the opening through the end wall 12 in order that the spider 13 and its peripheral liner member 15 may pass freely through the opening in the member 12. The inner walls of the end member 11 are formed with a shoulder 16 at an intermediate point which is engaged by a shoulder 17 formed on the peripheral liner member 15 above mentioned. The upper edge of the liner member 15 is beveled to provide a valve seat 18. The arms 19 of the spider 13 are preferably connected to the intermediate portions of the peripheral liner 15 at their outer ends and have their lower edges substantially straight, with their inner edges diverging inwardly toward the center so as to provide a widened area merging with the cylindrical walls of the hub or guide member 21. The spider 13 and its associated parts is adapted to be pressed into tight fitting engagement with the end member 11 of the casing after it is thus assembled. The valve plug is inserted therein preliminary to engaging the companion spider in position with the end wall 12. The spider member 14 has a peripheral liner member 22 which is formed on its outer surface with an offset shoulder 23 engaging a shoulder 24 formed on the inner wall area of the end member 12. The liner member is pressed into tight fitting engagement with the end member 12 after the plug unit has been duly seated within the guide member 21 and the spider 13 and after the operating spring of the plug is also engaged along the axial line of the apparatus, as will be presently described. The arms 24 of the spider 14 are spaced beneath the top marginal area of the liner member and are formed on a straight line at their outer edges, and their inner edges are directed inwardly so as to merge with the cylindrical hub or guide member 25 formed on the axial line of the device. The guide member 25 is of a size to slidingly receive the stem of the valve plug at its outer portion 26 and is of enlarged diameter adjacent its bottom portion 27 so as to prevent any obstruction to its action through the accumulation of foreign matter at such point. The valve guide member 25 is closed at its lower end by an end wall 28, preferably having a spring centering annular enlargement 29 on its inner face and also having a drainage aperture 31 centrally of the end wall.

The spring action of the apparatus is toward the spider 13, and it is unnecessary to provide additional securing means to maintain such spider in firm engagement with the end member 11 of the valve casing. The opposite spider 14 is substantially under the pressure of the valve spring, and in order to prevent any interference with the firm seating of such spider with the end wall 12 it is desirable to provide adjacent the end of each spider arm 24 a socket having a locking screw 32, such socket being formed on the dividing line between the spider structure and the adjacent casing wall so as to have the socket receiving such locking screw formed to one-half of its extent in the margin of the spider and through half of such socket in the margin of the casing. The locking screws thus firmly resist any tendency of the spider 14 to be displaced from its position in engagement with the end wall 12 of the casing, and thus all the parts of the assembled unit will be firmly held in operative relation. The valve plug is preferably formed with a convex body member 33 having an enlarged peripheral portion 34 provided with an offset shoulder 35 against which a peripheral liner member and valve seat 36 is engaged. The liner member is provided with a shoulder 37 adapted to be firmly engaged with the shoulder 35 on the body of the plug. The marginal portion of the liner adjacent the valve seat 18 is beveled to provide a companion valve seat 38 on the plug. Centrally of the plug structure a tubular member 41 is provided, such tubular member projecting an equal distance at either side of the body of the valve seat along the axial line thereof, and having an end wall 42 forming a closure for the portion engaged within the valve guide member 21. The upper portion of the cylindrical member 41 engages within the guide member 25 having sliding engagement with the area 26 of reduced diameter. When the valve seats are in engagement the upper end of the cylindrical member is spaced from the end wall 28 of the guide member 25, and is normally held in such relation by means of a coiled spring 43. The spring is preferably of a diameter slightly less than the inner diameter of the tubular member 41 so as to provide for free action of the spring when the same is compressed. The spring is held centrally of the guide member 25 by means of the spring centering element 29 on the end wall 28, as heretofore described.

The valve construction illustrated and described provides a non-oxidizing surface for the seats of the valve, and also provides non-oxidizing guide members within which the cylindrical central stem portion of the valve plug will slidingly engage. It is to be understood that hardened sleeves may be placed around the contact portions of the cylindrical stem of the valve plug at the points where contact is made with the guide members, if the action of the valve, or the fluids to be conveyed therethrough, require a non-oxidizing metal of greater hardness at such point. It is also intended to provide structures wherein the entire valve plug is fabricated out of stainless steel, or some metal having similar characteristics as to hardness and non-oxidizing quality. Such stainless steel plugs are more readily adaptable for use in valves of medium or smaller size construction, but where special uses so require, a valve of large size may also be made with a plug formed entirely of stainless steel or similar material.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. An article of the character described having in combination a body member providing side walls of substantially even thickness throughout and of outwardly bowed shape and having end walls provided with large central openings and marginal areas around said openings shaped to connect with pipe flanges of predetermined size, having bolt openings at spaced intervals through said end walls, said openings being connected in pairs by hollow cylindrical members within said body member to receive the assembly bolts and spaced from the side walls of the body member to permit free fluid circulation around the same, and to provide strength for the end walls, an independent spider unit frictionally engaged with each end wall of said body member, and means centrally of each spider unit for operatively supporting a valve plug.

2. An article of the character described having in combination a body member providing side walls of substantially even thickness throughout and of outwardly bowed shape and having end walls provided with large central openings and marginal areas around said openings shaped to connect with pipe flanges of predetermined size, having bolt openings at spaced intervals through said end walls, said openings being connected in pairs by hollow cylindrical members within said body member to receive the assembly bolts and spaced from the side walls of the body member to permit free fluid circulation around the same, and to provide strength for the end walls, an independent spider unit having a ring providing a complete liner for the inner surface of the end wall around the opening therethrough frictionally engaged with each end wall of said body member and means centrally of each spider unit for operatively supporting a valve plug.

3. An article of the character described having in combination a body member providing side walls of substantially even thickness throughout and of outwardly bowed shape and having end walls provided with large central openings and marginal areas around said openings shaped to connect with pipe flanges of predetermined size, having bolt openings at spaced intervals through said end walls, said openings being connected in pairs by hollow cylindrical members within said body member to receive the assembly bolts and spaced from the side walls of the body member to permit free fluid circulation around the same, and to provide strength for the end walls, an independent spider unit having a ring providing a complete liner for the inner surface of the end wall around the opening therethrough frictionally engaged with each end wall of said body member, one of said liners providing a valve seat, a valve guide member centrally of each spider unit, and a valve plug engaged in said guide members in operative relation to said valve seat.

MICHAEL SMOLENSKY.